Oct. 28, 1952  P. E. FISCHER  2,615,746
CRATE UNLOADER
Original Filed June 3, 1944   8 Sheets—Sheet 1
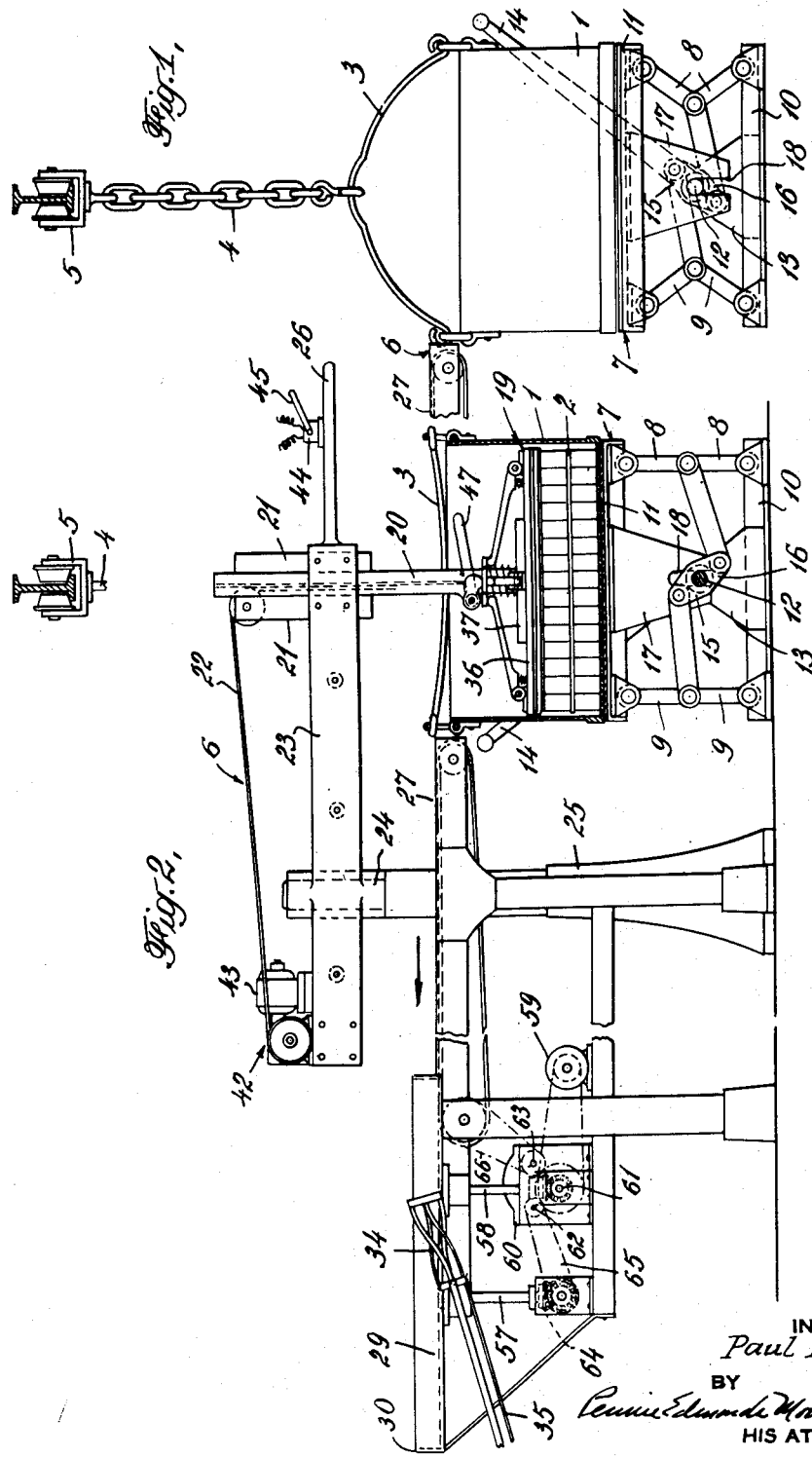
INVENTOR
*Paul E. Fischer*
BY
HIS ATTORNEYS

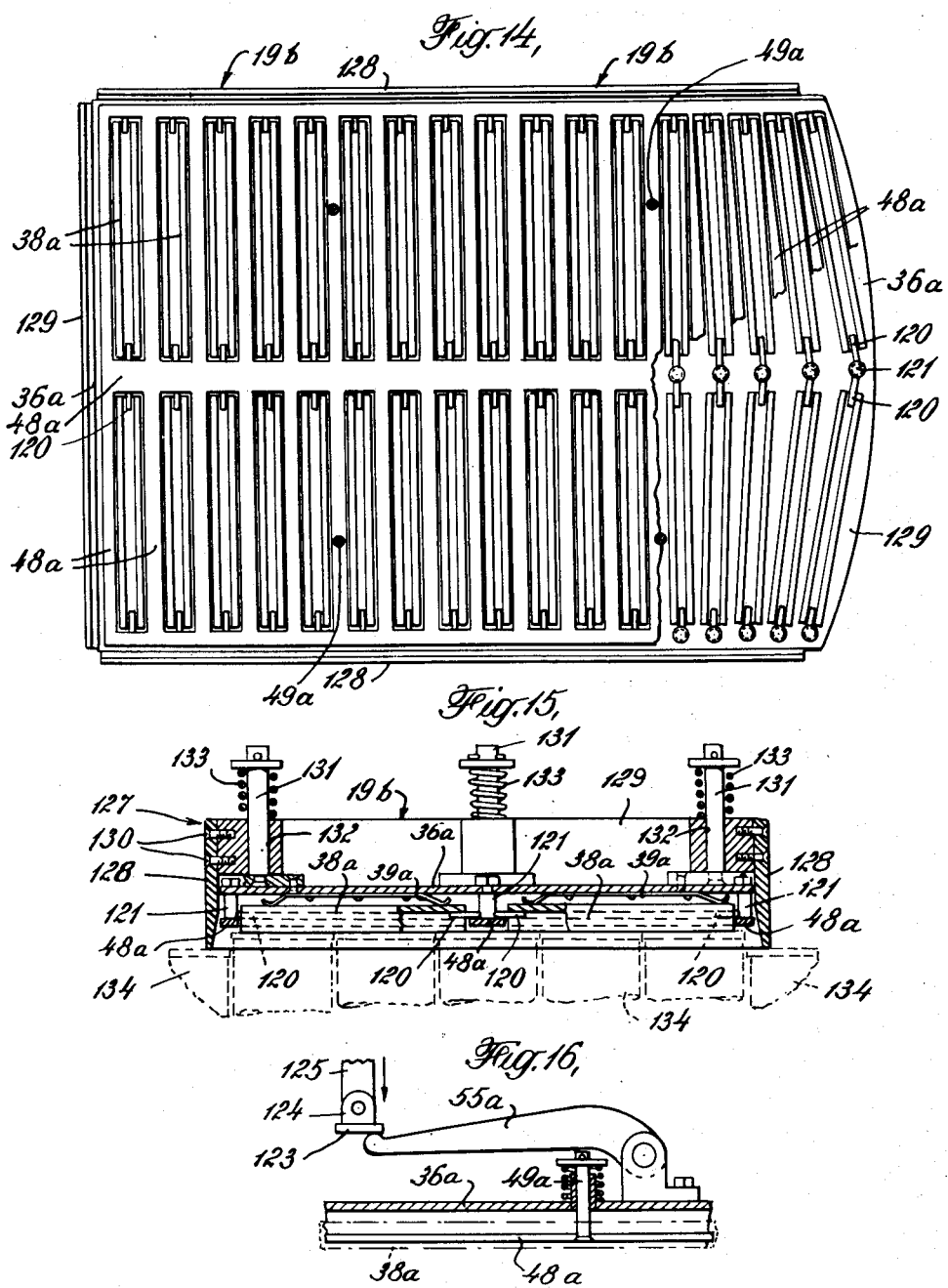

Oct. 28, 1952 P. E. FISCHER 2,615,746
CRATE UNLOADER
Original Filed June 3, 1944 8 Sheets-Sheet 3
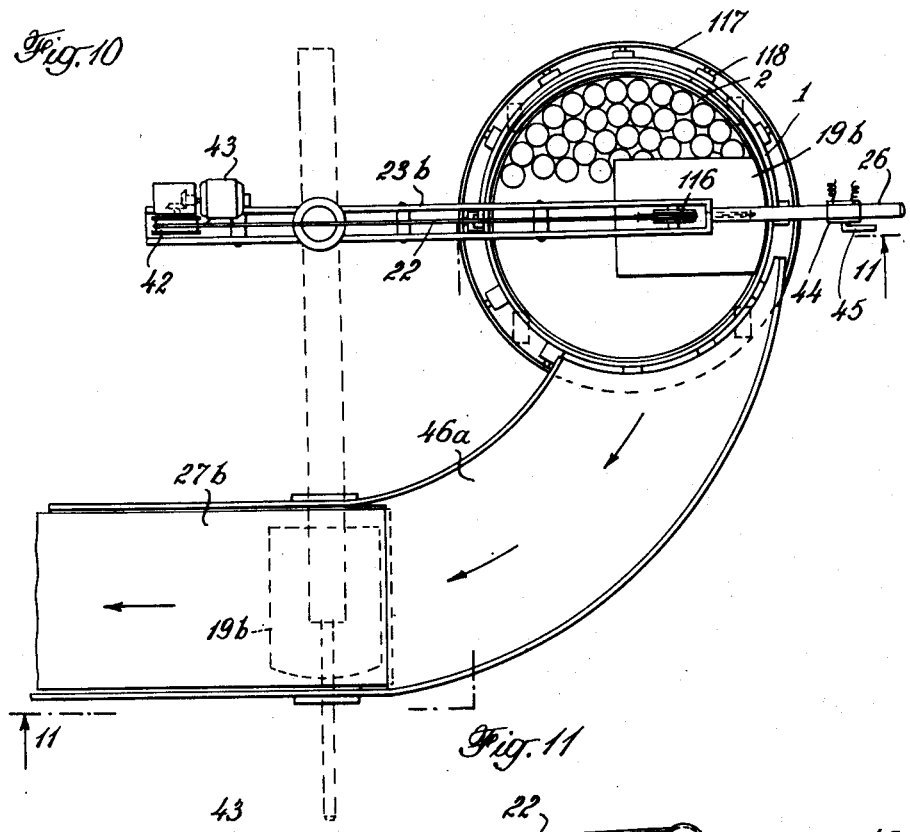
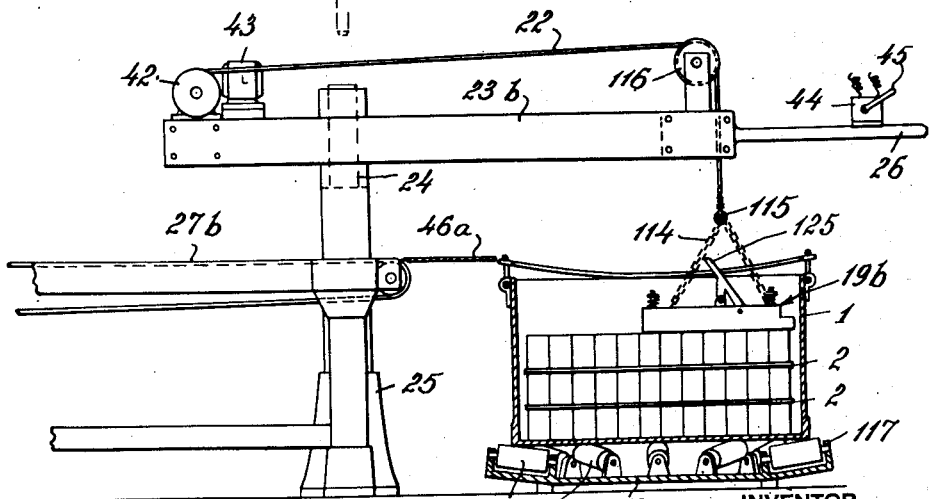
INVENTOR
Paul E. Fischer
BY
HIS ATTORNEYS Oct. 28, 1952 P. E. FISCHER 2,615,746
CRATE UNLOADER
Original Filed June 3, 1944 8 Sheets-Sheet 4
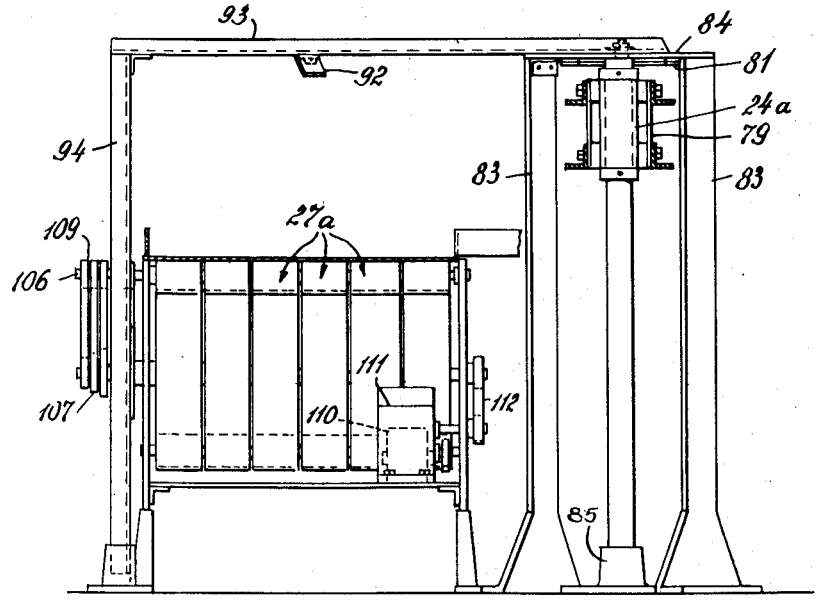
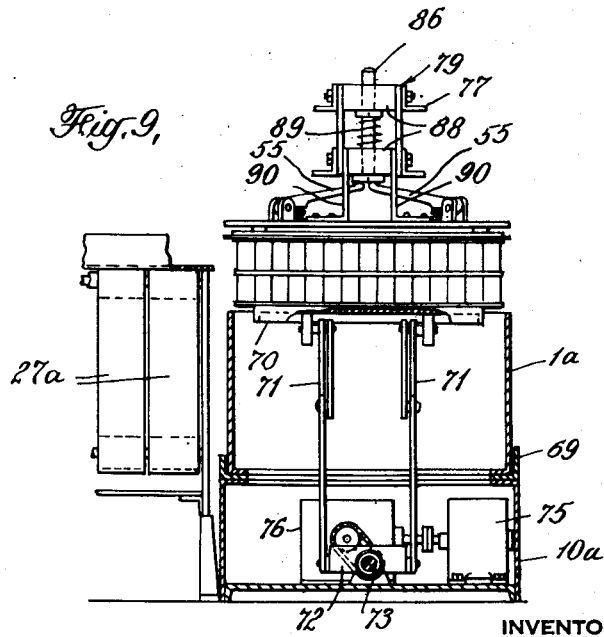
INVENTOR
Paul E. Fischer
BY
HIS ATTORNEYS

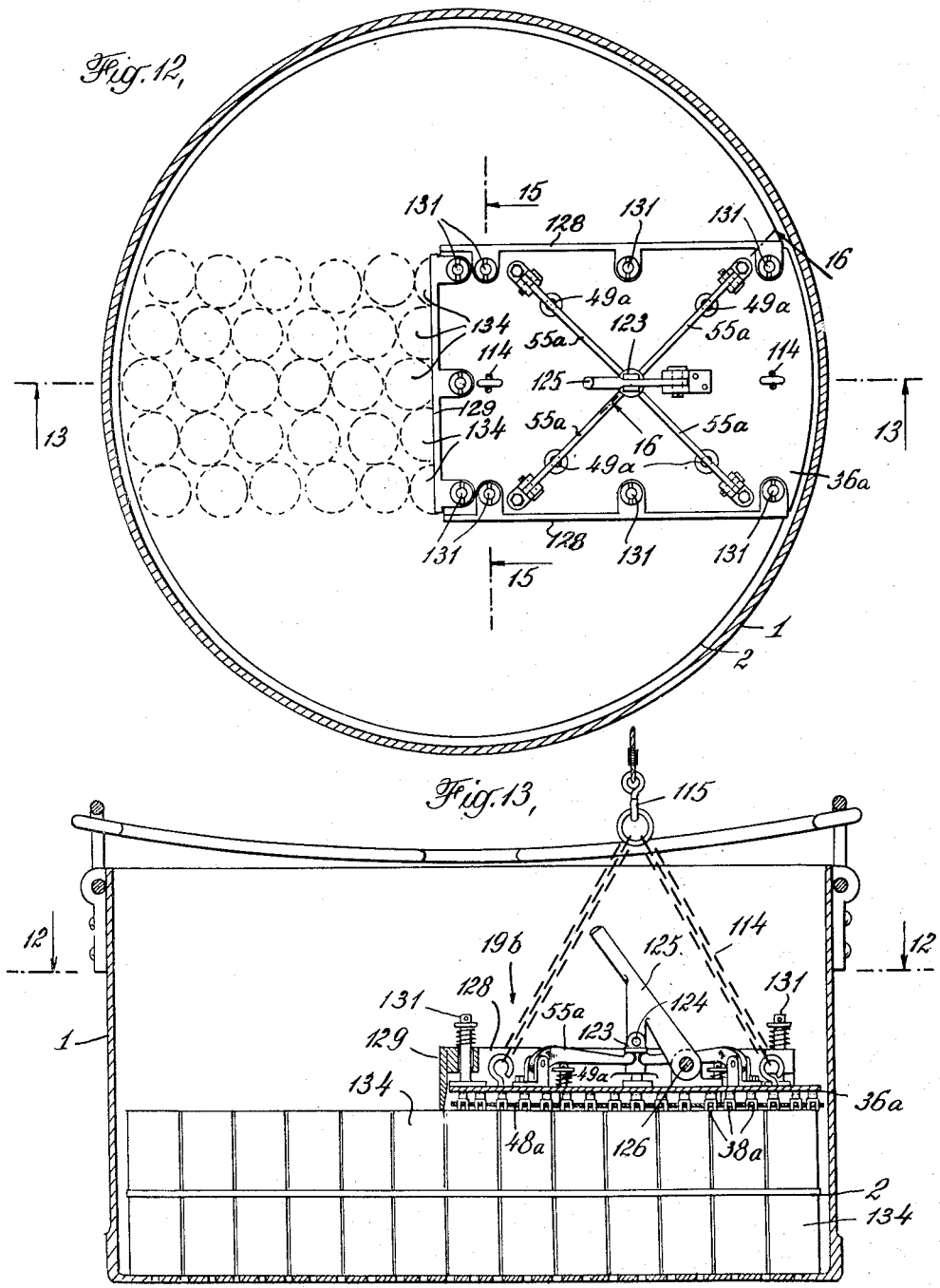

Oct. 28, 1952 P. E. FISCHER 2,615,746
CRATE UNLOADER
Original Filed June 3, 1944 8 Sheets-Sheet 6
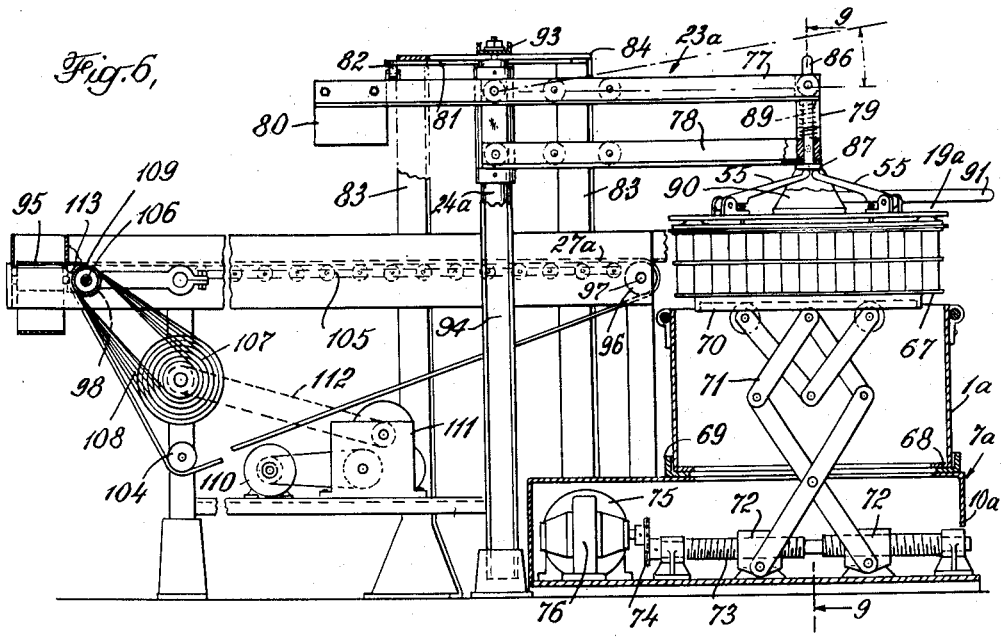
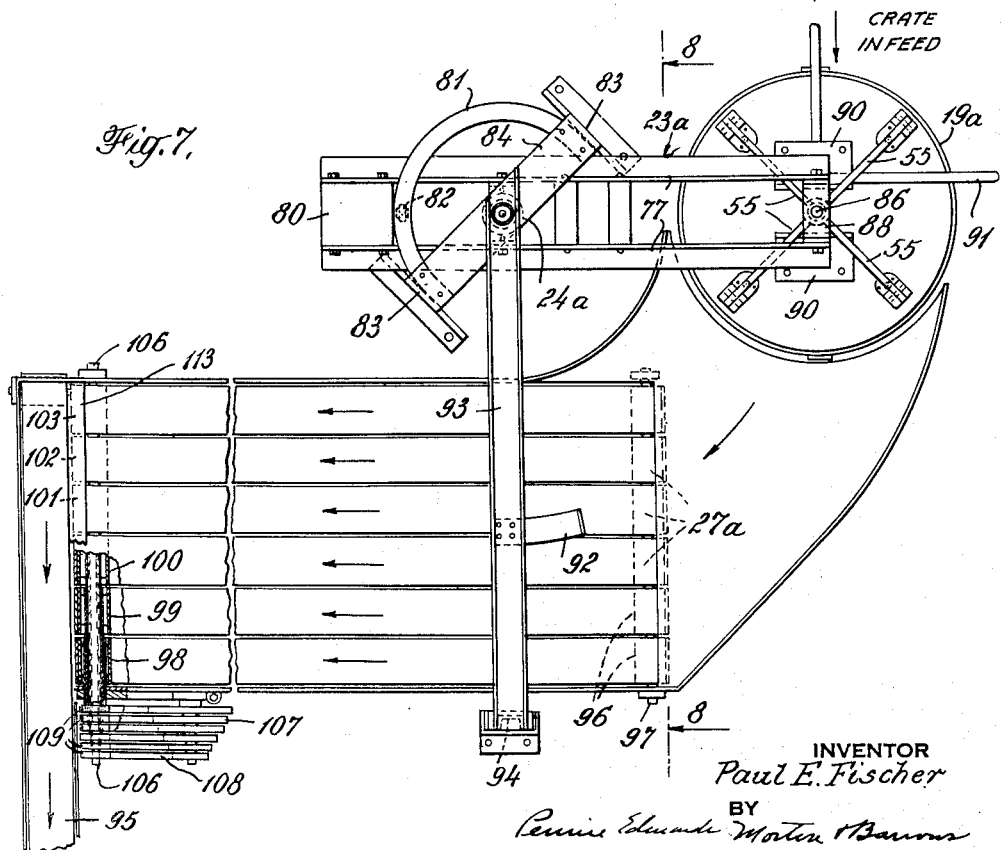
INVENTOR
Paul E. Fischer
BY
HIS ATTORNEYS

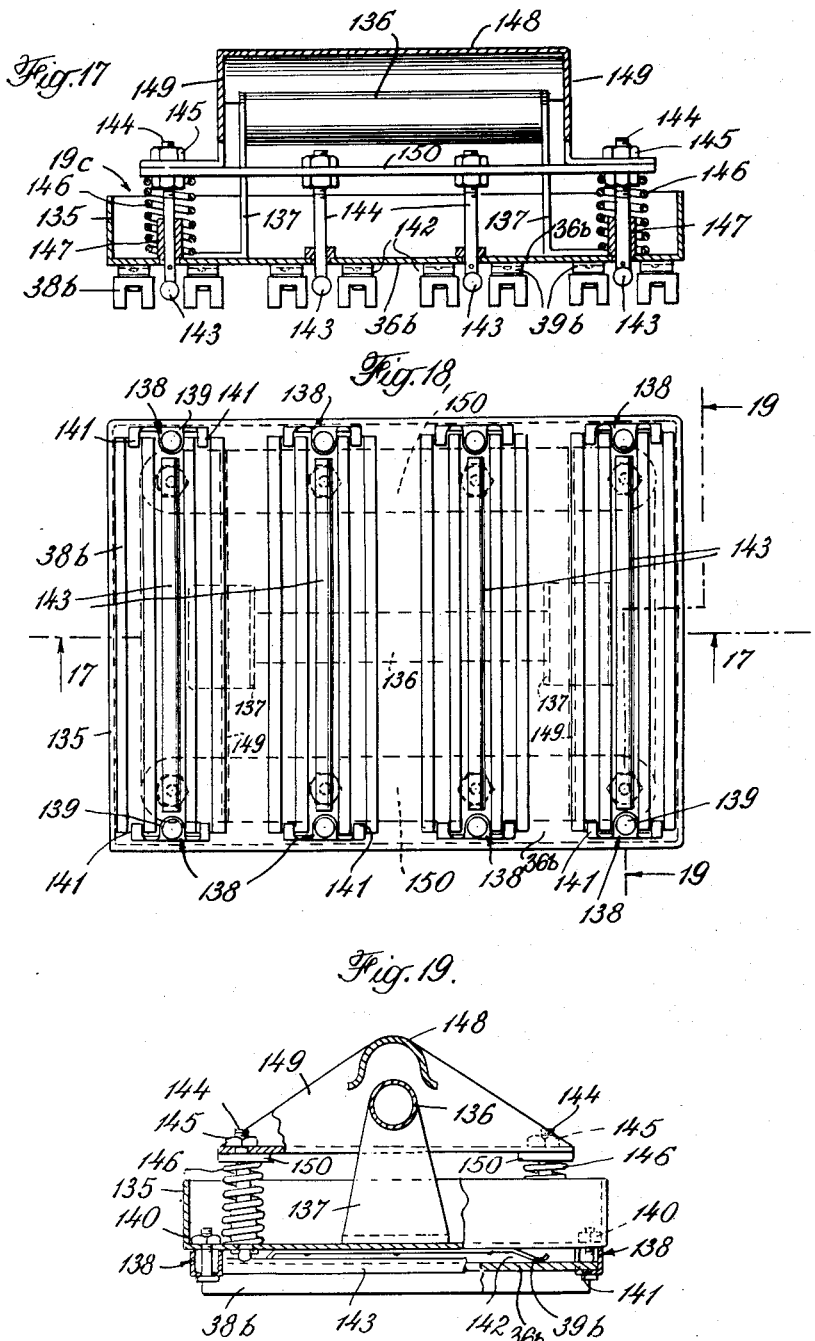

Oct. 28, 1952 P. E. FISCHER 2,615,746
CRATE UNLOADER
Original Filed June 3, 1944 8 Sheets-Sheet 8
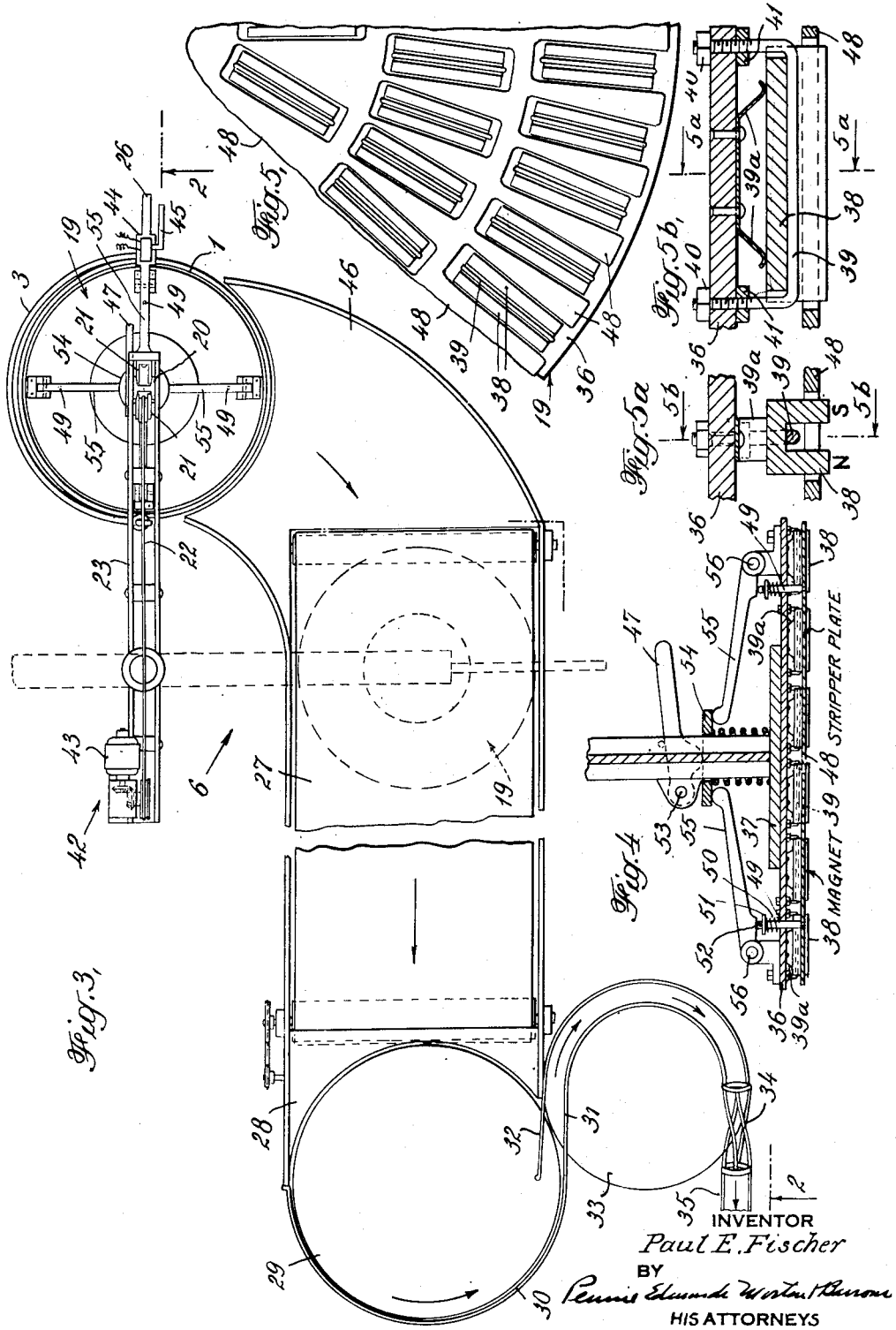
INVENTOR
Paul E. Fischer
BY
HIS ATTORNEYS Patented Oct. 28, 1952

2,615,746

UNITED STATES PATENT OFFICE 2,615,746

CRATE UNLOADER

Paul E. Fischer, Portland, Conn., assignor, by mesne assignments, to Emhart Manufacturing Company, a corporation of Delaware Original application June 3, 1944, Serial No. 538,565. Divided and this application April 8, 1949, Serial No. 86,411

14 Claims. (Cl. 294—65.5)

This invention relates to apparatus for handling containers and, more particularly, to apparatus for unloading containers such as cans or glass jars from retort crates and feeding them in a continuous line to the apparatus which performs the next operation upon them.

This application is a division of the applicant's copending application, Serial No. 538,565, filed June 3, 1944, now Patent 2,466,693 issued April 12, 1949.

In processing many articles of food and the like, after the containers have been filled with the product they are placed in a large open top holder or basket, usually referred to as a crate, of a size which will hold several hundred containers. It affords a convenient means for handling the containers while they are subjected to the desired treatment, as, for example, in a cooker. After the treatment process has been completed the containers are removed from the crate and are ready for the next operation such as labelling or packing for temporary storage.

It has been found convenient to arrange the cans in the processing crate in layers, the cans in each layer standing in upright position but otherwise in random formation, that is to say, not arranged in rows. The problem is to remove the cans from the crate after the processing has been completed and rearrange them from their random formation into a single line to facilitate their being conveyed to and fed into the labeling, packing, or other, machine. The object of the present invention is to provide an improved apparatus for solving this problem—to provide an improved apparatus for rearranging the containers from the static layer formation into a moving mass of upright containers and then into a single moving line.

A further object of the invention is to provide an improved apparatus which is capable of removing the containers from the retort basket or crate without liability of damaging the containers by denting, marring or breakage.

Another object of the invention is to provide an apparatus of the type referred to which is capable of removing from the retort crate either the entire group of containers comprising a single layer, or any desired portion thereof.

In the accompanying drawings several modifications of the invention have been illustrated. In these drawings:

Fig. 1 is a side elevation of a loaded retort crate which has been placed in position on the unloading apparatus ready to have its contents removed;

Fig. 2 is a side elevation of the unloading apparatus showing the crate in vertical central section and partially unloaded. See broken line 2—2 of Fig. 3;

Fig. 3 is a plan view of the apparatus shown in Fig. 2;

Fig. 4 is a vertical section drawn to an enlarged scale to show the construction of the container lifting head;

Fig. 5 is a bottom view of a fragment of the lifting head drawn to an enlarged scale;

Fig. 5a is a section of a detail taken on line 5a—5a of Fig. 5b;

Fig. 5b is a similar section taken on line 5b—5b of Fig. 5a;

Fig. 6 is a view similar to Fig. 2 showing a modification;

Fig. 7 is a plan view of the apparatus shown in Fig. 6;

Fig. 8 is a transverse vertical section taken on line 8—8 of Fig. 7;

Fig. 9 is a similar section taken on line 9—9 of Fig. 6;

Fig. 10 is a plan view showing another modification of the invention;

Fig. 11 is a view partly in side elevation and partly in vertical section taken on line 11—11 of Fig. 10;

Fig. 12 is a sectional view taken on the line 12—12 of Fig. 13 showing the construction of the lifting head of Figs. 10 and 11;

Fig. 13 is a vertical section taken on line 13—13 of Fig. 12;

Fig. 14 is a bottom view of the lifting head of Figs. 10 and 11 with a part broken away;

Fig. 15 is a transverse vertical section taken on line 15—15 of Fig. 12;

Fig. 16 is a section taken on line 16—16 of Fig. 12 showing a detail;

Fig. 17 is a vertical section taken on line 17—17 of Fig. 18 showing a further modification;

Fig. 18 is a bottom view of the device shown in Fig. 17; and

Fig. 19 is a view partly in end elevation and partly in section as shown by broken line 19—19 of Fig. 18.

Referring now to the accompanying drawings, and first to Figs. 1–3, inclusive, the retort crate 1 is filled with the containers arranged in upright position in layers, the layers preferably being separated from one another by circular plates 2 which are preferably perforated to facilitate the flow of the cooking solution between the cans. Crate 1 has a bail 3 which is engaged by the chain 4 of a rail conveyor carriage 5 by which the filled crate is conveyed from the cooking apparatus to the unloading apparatus which is indicated generally by numeral 6. Adjacent the receiving position of the unloading apparatus is the platform of an elevating mechanism indicated generally by numeral 7. This is a hand operated mechanism intended to raise the crate only two or three inches or just enough to permit the hook of chain 4 to be released from the bail 3 so that the chain 4 and its associated carriage can be returned to the processing apparatus for another crate while the crate 1 is being unloaded.

Accordingly elevating mechanism 7 may comprise a platform which is supported by pairs of toggle members 8 and 9. The lower members of the toggles are pivoted as shown in Fig. 1 to a base 10 while their upper members are pivoted to a platform 11 which supports the crate. Between the two pairs of toggles there is a horizontal cross shaft 12 which is mounted for rocking movement in a stationary support 13. This shaft is actuated by a long hand lever 14 and is also provided with oppositely directed levers 15 and 16 which are connected respectively to toggles 9 and 8 by means of suitable links. Hence when hand lever 14 is swung from the position shown in Fig. 1 to that shown in Fig. 2, toggles 8 and 9 are caused to straighten, thereby raising platform 11. In order to maintain the platform horizontal it may be provided with one or more depending plates 17 each having a vertical slot 18 which engages shaft 12.

The operator now proceeds to unload the crate one layer at a time by means of the unloading apparatus 6 which includes a magnetic lifting head 19. That is to say, the containers are picked up by the lifting head by means of magnets attached thereto. This type of lifting head has been found to operate successfully not only on the so-called "tin" can of commerce, but also upon glass jars having closures formed at least in part of magnetizable material. A common form of such closure comprises a glass cap held in place by a metal ring screwed, or otherwise secured, to the top of the jar. This metal ring is usually of the same material as tin containers comprising thin steel sheet having a coating of tin or other rust preventative.

Lifting head 19 is fixed on the lower end of a vertical supporting bar 20 which may be in the form of an I section, as shown in Fig. 3, and which is carried between vertical guides 21, the bar sliding between these guides under the action of a hoisting cable 22 so as to raise and lower the lifting head 19. Guides 21 are mounted near the outer end of a swinging crane 23 which is carried on a vertical post 24, and pivotally mounted in a standard 25 to permit the crane to swing in a horizontal plane from the full line position to the dotted line position of Fig. 3. The crane has a handle 26 at its outer end for this purpose.

As lifting head 19 reaches approximately the dotted position of Fig. 3 the layer of cans is released therefrom onto a wide conveyor belt 27 which moves continuously towards the left in the direction of the arrows.

It is important to keep the containers in upright position and should the moving belt 27 jerk their bottoms forward too severely there would be a tendency for the containers to be upset. The swinging crane cooperates with the conveyor 27 to avoid or reduce this tendency inasmuch as the crane sets the cans in motion in the same direction and to about the same extent as the conveyor, the cans preferably being released from head 19 while the head is still moving. Thus the crane and lifting head serve to accelerate the cans to about the same speed as conveyor 27.

Conveyor 27 carries the cans over a scuff plate 28 onto a horizontal continuously revolving disk 29 which is surrounded by a semicircular guard rail 30. The rotation of disk 29 converges the cans by centrifugal action into a single semicircular line or row and carries them in this formation between straight parallel stationary guides 31 and 32. The cans may be guided directly onto a reversing disk 33 which rotates in the opposite direction from disk 29. Guides 31 and 32 may be continued in semicircular form around the margin of reversing disk 33 and direct the cans still in upright position into a twister 34 by which the cans are turned into horizontal position and delivered in rolling engagement with an inclined conveyor 35. Conveyor 35 may deliver the cans to a labeling machine or to whatever other apparatus may perform the next desired operation upon them.

The magnetic lifting head 19 comprises a circular steel supporting plate 36 which may be secured to the lower end of supporting bar 20 in any suitable manner, as, for example, by means of a circular foot plate 37 provided at the lower end of this bar. Mounted in fixed position on the lower face of circular plate 36 are permanent magnets 38. These magnets are all alike and each consists of a suitable length of highly retentive steel having a channel section such as shown in Fig. 5a.

Magnets 38 are of elongated shape, their length being several times their width or height. Moreover they are narrow enough so that a plurality of magnets may engage the top of each container. They are distributed over the bottom of supporting plate 36 with substantial uniformity so that a group of containers may be lifted without prearrangement in any particular formation and merely by lowering the lifting head into contact with the tops of the containers.

Magnets 38 may be attached to the bottom of plate 36 by any convenient means which will hold them securely and permanently in position, and allow them to "float" or shift and rock slightly with respect to plate 36 so as to permit their polar surfaces (as indicated by reference characters N and S) at the bottoms of the channel legs to accommodate themselves, when necessary, to the tops of the containers. The reason for mounting the magnets 38 in this manner is that it is important to have the tops of the containers in actual contact with the pole faces of the magnets in order to obtain maximum lifting force and avert the possible release of containers from the lifting head before the proper time.

With this in view, magnets 38 may be attached to plate 36, as shown in detail in Figs. 5, 5a and 5b. Each of the elongated channel shaped magnets 38 is held in place by means of a U-shaped bolt 39, the body of which is disposed in the channel of the magnet while the legs of the U-bolt pass through suitable apertures in plate 36. The legs are fixed in these apertures by nuts 40 and 41, the body of the U-bolt being spaced from the lower surface of plate 36 so as to cause the magnets to be loosely held in place, as may be seen in Figs. 5a and 5b. Leaf springs 38a riveted to plate 36 retain the magnets within their U-bolt supporting yokes and keep their pole faces in the same plane. By means of such a floating mounting, the magnets can rock slightly in any direction and move bodily a limited amount with respect to supporting plate 36.

Magnets 38 are arranged in substantially radial formation and preferably in a series of concentric rows as shown in Fig. 5. In this way a magnetic flux intensity sufficient to lift heavy containers is distributed over the area of the lifting head without the necessity of using magnets made of the most expensive and most highly retentive alloys.

In order to remove the layers of cans from the crate 1, it is necessary to lift them over the edge of the crate and somewhat above the surface of conveyor belt 27, then transport them horizontally until they are over the belt, and then release them so that they may be carried forward by the belt to the converging disk 29. The lifting head 19 with a layer of cans magnetically attached to it, as shown in Fig. 2, is hoisted vertically by means of hoist cable 22 and an electric hoist indicated generally by numeral 42 and operated by a motor 43. The operation of motor 43 is controlled by means of a controller 44 having a handle 45 which is disposed adjacent operating handle 26 of crane 23.

The operator, therefore, by manipulating handle 45 may cause the operation of motor 43 and the resulting pull of hoist 22 will cause supporting bar 20 to slide upwardly between guides 21, thereby raising lifting head 19 with the layer of cans adhering beneath it. The upward movement of the lifting head may be stopped by means of handle 45, although preferably a limit switch (not shown) is provided automatically to stop the further hoisting movement when the bottoms of the cans have cleared the top of the crate and belt 27.

The operator now swings crane 23 in the clockwise direction as shown in Fig. 3, by means of handle 26 until the lifting head 19 has reached the position shown in dotted lines immediately over the left hand end of belt 27. A curved extension table 46 is provided between the side of the crate as it is supported on its elevating mechanism 7 and the end of conveyor 27. This extension is at substantially the same level as conveyor 27 and serves to prevent damage or breakage to any containers which might be accidently displaced from the lifting head 19 before the lifting head is wholly over belt 27.

Approximately as the lifting head reaches the dotted position shown in Fig. 3, the cans are released onto the belt by means of a stripping mechanism which is actuated by the operator by means of a handle 47 (Fig. 4). This stripping mechanism comprises a stripper plate 48 which is a member made of non-magnetic material such as aluminum and which has an irregular shape, as shown in Fig. 5, having portions which extend throughout the spaces between the individual magnets 38, as indicated in Figs. 4, 5, 5a and 5b.

Stripping plate 48 is supported by means of four pins 49 (Figs. 4 and 3), the lower ends of which may be riveted to the stripper plate. These pins are mounted vertically in apertures in plate 36 and are provided each with a helical spring 50 between the upper surface of plate 36, and a washer 51 which is held in place by a cotter pin 52 at the upper end of the pin. Springs 50 serve to hold stripper plate 48 normally in the position shown in Fig. 4, that is, between the plane of the polar surfaces of magnets 38 and the surface of plate 36 so as not to interfere with the picking up of the cans by the magnets.

When it is desired to strip the cans from the magnets the downward motion of handle 47, which is pivoted at 53, is communicated to a collar 54 which bears upon the inner ends of four levers 55, each pivoted at a point near the outer periphery of place 36 as indicated by numeral 56. This downward motion of levers 55 is communicated to pins 49, as shown in Fig. 4, and results in depressing the lower surface of stripper plate 48 outward, below the pole faces of magnets 38, thereby forcing the cans away from the magnets.

The converging disk 29 and reversing disk 33 are mounted respectively on vertical shafts 57 and 58 as shown in Fig. 2, and are driven by an electric motor 59 through a reducing gear 60 to which the motor is belted. Reducing gear 60 has three output shafts 61, 62 and 63. Output shaft 61 is connected through beveled gearing to vertical shaft 58 of reversing disk 33 and output shaft 62 is connected to drive vertical shaft 57 through bevel gearing 64 and a chain 65. The third output shaft 63 is connected to drive conveyor belt 27 by means of a chain 66.

Referring now to the modification shown in Figs. 6-9, inclusive, all three elements of the apparatus-crate support, crane and converging mechanism, are of changed construction. Crate 1a itself differs from crate 1 in that it is provided with a removable bottom 67 which is supported on a ledge 68 around the bottom of the side of the crate when the crate is filled with cans, but which can be raised as shown in Fig. 6, to facilitate the unloading process.

The crate support, indicated generally by numeral 7a includes a base 10a, on top of which is a ring 69 which may be made of angle stock and which serves to support the body of crate 1a properly centered over an elevating mechanism by which the bottom 67 of the crate may be elevated from time to time during the unloading of the crate as each layer of cans is removed.

This elevating apparatus comprises a platform 70 to engage the crate bottom 67 which is raised and lowered by means of a lazy tongs mechanism 71 actuated by means of a pair of nuts 72 which engage a horizontal shaft 73 provided with right and left hand threads so that as the shaft is rotated in one direction, nuts 72 approach each other and cause platform 70 to rise. When the shaft is rotated in the opposite direction, nuts 72 recede from one another and cause platform 70 to be lowered.

Shaft 73 is operated by suitable chain or other gearing 74 from an/electric motor 75 through reduction gear 76. Motor 75 is controlled by an operating handle (not shown).

Crane 23a is not provided with a hoist, but consists of two pairs of parallel arms 77 and 78 pivoted at their left hand ends to a vertical post 24a and connected at their right hand ends by means of a structure 79. The upper pair of arms 77 extend to the opposite side of supporting post 24a and are provided with a weight 80 of a suitable size to substantially balance lifting head 19a when it is supporting a layer of cans.

Platform 70 is raised step by step to bring the tops of the successive layers of cans into contact with the magnets of lifting head 19a.

The lifting head can then be manually swung clockwise as in Fig. 7 as previously described in connection with Figs. 1-3. During such movement any lifting effort on the part of the operator is eliminated by means of the fixed semicircular horizontal rail 81 which is engaged by the roller 82 pivoted on the upper pair of arms 77 in the vicinity of weight 80. Rail 81 is supported in upright frame members 83 which extend to the floor. Supporting post 24a for crane 23a is also supported by means of upright frame members 83 and a horizontal cross member 84 near the top thereof in which the upper end of post 24a is pivotally mounted. The lower end of post 24a is pivoted in a socket 85 Fig. 8.

Lifting head 19a is identical in construction with lifting head 19 except that the hand operated stripping lever 47 and ring 54 actuated by it are omitted and in their place there is provided a vertically shiftable rod 86 which at its lower end has a mushroom enlargement 87 to coact with the inner ends of levers 55. Rod 86 is mounted for free but limited vertical movement in suitable guides 88 (Fig. 9) between the right hand ends of arms 77 and 78 and is biased upwardly by means of a helical spring 89. Magnetic lifting head 19a is supported on structure 79 at the right hand end of the crane 23a by means of two angled supporting members 90.

The function of vertically movable rod 86 is to effect the automatic actuation of the stripping mechanism of lifting head 19a when it is swung by means of handle 91 into position over the conveyor 27a. To this end a cam member 92 is mounted in fixed position over the right hand end of conveyor 27a and is engaged by the upper end of rod 86 forcing the rod downwardly and causing the stripping of the layer of cans from the magnets of the lifting head while the cans are being moved forward by the crane and lifting head at about the same velocity as the average speed of belts 27a. In order to support cam 92 a horizontal member 93 may extend from member 84, which supports the upper end of vertical post 24a, to the opposite side of conveyor 27a where it is secured to the upper end of an upright frame member 94.

In the modification shown in Figs. 6–9, inclusive, the converging disk 29 is omitted, and instead of employing a single wide belt 27, the converging apparatus 27a comprises a plurality of narrow belts 27a and a single narrow delivery belt 95. These belts may, if desired, all be made of the usual fabric belting, but preferably are composed of metal plates suitably hinged together to form an endless belt, or such metal plates may be supported on the links of endless chains.

Belts 27a are supported at their right hand ends on a series of separate pulleys indicated by numeral 96 which rotate on a common shaft 97. At their opposite ends these belts are supported on a series of separate driving pulleys 98, 99, 100, 101, 102, 103. Belts 27a return over idler pulleys 104 which may be adjusted in order to keep the upper horizontal operating portions of the pulleys taut. These horizontal operating portions may be supported by means of a horizontal table 105 in order to provide a uniformly horizontal table surface between pulleys 96 and 98–103, inclusive, on the right hand end of which the groups of containers are deposited.

Driving pulleys 98–103, inclusive, are supported on a series of concentric shafts indicated generally by numeral 106, the pulley 103 being fixed to the innermost of this series of concentric shafts and remaining pulleys 102, 101, 100, 99 and 98 being fixed to a series of sleeve shafts of different lengths, and in order to drive these shafts at different speeds the stepped pulley mechanism shown in Figs. 6 and 7 is provided. The stepped driving pulley 107 is rotated at constant speed and provided with six sections of different diameter to correspond with the six belts 27a.

A series of narrow driving belts 108 is provided between stepped pulley 107 and a series of small pulleys 109, one fixed to each of the concentric shafts of pulleys 98–103, inclusive. The belt 27a which is nearest the stepped pulley 107 is operated (in the embodiment illustrated) at the highest surface speed. Consequently the shaft which supports its driving pulley 98 is the shortest of the series of concentric shafts and is rotated by the pulley 109 which is belted to the largest section of stepped pulley 107. The remaining belts 99–103, inclusive, are each driven at progressively slower surface speeds by the remaining pulleys 109 which are fixed to the ends of the remaining concentric shafts which support these several converger belt pulleys.

Stepped pulley 107 is driven at a suitable speed by means of a motor 110 which is connected to the shaft of pulley 107 through a speed reducing gear 111 and an operating chain 112.

When a group of cans is deposited near the right hand end of converger belts 27a by the magnetic lifting head 19a, they are carried forward in upright position towards the left, as shown in Fig. 7, and, on reaching the left hand end of belts 27a, pass over a short scuff plate 113 onto the delivery belt 95 which travels in the direction of the arrow shown in Fig. 7 crosswise with respect to belts 27a.

Inasmuch as the belt 27a (which is driven by pulley 98 and is nearest the delivery point of the cans by belt 95) operates at the highest linear speed, such cans as are carried forward by this belt 27a reach the delivery belt 95 ahead of the cans which are carried by the remaining belts 27a. The same is true for each of the other belts 27 or with respect to those which run at a slower speed. Hence the cans will be arranged in a single line on belt 95 although they may not necessarily be equally spaced from one another. Belts 27a are in width not greater than from two to three times the diameter of the containers, thereby causing them to be worked over from one belt to another by the motion of the belts and the crowding of the cans in contact with one another. The cans on delivery belt 95 are in upright position and may be changed to rolling position by passing them through a twister such as indicated at 34 in Fig. 2.

Referring now to Figs. 10–16, inclusive, in these figures there is illustrated a modification of the crate unloader in which only a portion, or fraction, of the containers of a given layer in the crate is removed by a single trip of the crane and the magnetic lifting head carried thereby. In this apparatus, therefore, the lifting head may be smaller in size, the crane need not be of such heavy construction as in the forms shown in Figs. 1–9, inclusive, and a much narrower converger belt may be used.

It is contemplated that it shall require about five trips of the lifting head 19b to remove a single layer, and consequently the lifting head may be of about the size relative to the diameter of the crate 1, as is shown and is preferably of rectangular shape but rounded at its right hand end to conform approximately to the curvature of the crate.

It will be understood that crate 1 is of the same construction as the crate shown in Figs. 1–3, inclusive. Also the crane 23b is not unlike crane 23, being supported on post 24 and standard 25 similar to the corresponding parts of Fig. 2, and provided with a hoist 42 driven by motor 43, both of which are mounted on the opposite side of post 24 from the lifting head 19b. The lifting head, however, is supported in a different manner from that shown in Fig. 2, being swung on a pair of chains 114 having a ring at their upper ends which is placed on a hook 115 at the end of cable 22, and a pulley 116 is provided at the outer end of crane 23b over which cable 22 passes downwardly to the lifting head.

Hoist motor 43 has the same controller 44 with operating handle 45 mounted on main handle 26 for the crane as in the modification shown in Fig. 2. Converger belt 27b, however, is only approximately one-half of the width of converger belt 27 and extension 46a may be correspondingly narrower than extension 46 of Fig. 3.

In order, however, to bring the various parts of an entire layer of cans at different times under the magnetic lifting head 19b, a roller support, indicated generally by numeral 117, as shown in Fig. 11, may be provided. This comprises a series of rollers 118 mounted on a circular frame 119 with their axes extending radially from a common center and also being inclined so that when the crate 1 is placed upon the roller support 117 the corners of the crate bottom will rest upon rollers 118. When on this support, crate 1 may be rotated by hand to bring all portions of each layer of cans within the range of lifting head 19b.

The construction of lifting head 19b is shown more particularly in Figs. 14, 15, 16 and 13. It comprises a rectangular steel supporting plate 36a, to the lower surface of which a series of permanent magnets 38a is attached, each of these magnets being in the shape of elongated channel members with their backs adjacent the bottom of plate 36a and with both the north and south magnetic poles of each magnet in the same plane and projecting downwardly from plate 36a. These magnets are supported in floating relation to plate 36a, as previously described, and may be held in place by means of short pins 120 which project laterally from the heads of bolts 121 and enter the ends of each of the channel-shaped magnets, as shown in Figs. 15 and 14. Bolts 121 are secured in apertures in plate 36a by means of nuts, as shown in Fig. 15, and the pins 120 are at such a distance below the shoulders formed at the tops of heads 121 as to support the magnets in slightly spaced relation to the bottom of plate 48a, in which they are maintained by springs 39b.

The stripper plate 48a is a substantially rectangular grid-like member having portions occupying the spaces between the various magnets 38a. It is supported and actuated by the four vertical pins 49a, as described in connection with Fig. 4. These pins are actuated by four levers or arms 55a, the inner ends of which extend beneath an actuating member 123 (Fig. 13) which is pivoted at 124 to a hand lever 125 which is pivoted at 126 to supporting plate 36a. It will be understood that by moving the lever to the left and downwardly, as viewed in Fig. 13, stripper plate 48a is actuated to strip the cans from the pole faces of magnets 38a.

Inasmuch as magnetic lifting head 19b is smaller in area than the layer of cans, when the lifting head is lowered to pick up a charge or group of cans, some of the containers around the periphery of the lifting head will make only partial contact with the magnets 38a. For this reason the pull of the magnets, while it is likely to be inadequate to lift the containers safely, may lift them a short distance, and allow them to drop back, or turn on their sides. This might break glass containers or damage metallic ones by marring, or denting, and to overcome this tendency a peripheral stripping device, indicated generally by numeral 127 is provided.

This supplementary stripping device comprises two side stripping bars 128 and an end stripping bar 129. These bars may be mounted each as shown in Figs. 12 and 15 on a series of posts 131 (Fig. 15) which are fixed in any desired way to plate 36a of the lifting head. Bars 128 and 129 are secured by screws 130 to bosses having apertures 132 therein to receive posts 131 with a loose sliding fit so that all of the bars are free to move upwardly with respect to the lifting head.

Posts 131, however, are provided with helical springs 133 which bias bars 128 and 129 downwardly, forcing the bosses which contain apertures 132 against plate 36a or against the supporting bases of the posts. When the bars 128 and 129 are in this position, their lower edges project a short distance below the plane of the polar faces of magnets 38a, as indicated in Fig. 15. The bars are free, however, to move upwardly under the resistance of springs 133.

When the lifting head 19b is lowered into contact with a layer of cans, for example, as shown in Fig. 13, the cans which are only partially within the range of the attractive force of the magnets, such, for example, as cans 134, will be engaged by the bottom edges of the supplemental stripper bars 128 and 129. As the pole surfaces of the magnets are lowered into contact with the tops of the containers, as shown in Fig. 13, these stripper bars 129 and 128 will be shifted upwardly with respect to the lifting head by the pressure of cans 134. However, when the upward movement of the lifting head 19b commences, under the action of cable 22, springs 133 will cause stripper bars 128 and 129 to return to their original position, as shown in Fig. 15, and this will force the cans 134 far enough out of the field of the magnets 38a to prevent the displacement of these cans.

The modification of the magnetic lifting head shown in Figs. 17, 18 and 19 is intended for hand operation. It has been found that a group of twelve containers of moderate size can be lifted by hand conveniently by the average worker in food processing plants, and in small plants there is a need for a device for handling such groups of cans, not only in unloading processing crates but also in loading or charging them with cans before the processing treatment, and for handling cans in groups for other purposes. The device of Figs. 17–19, inclusive, satisfies such requirements.

The magnetic lifting head 19c comprises a rectangular metal plate 36b preferably having an upwardly extending flange 135 around its periphery. A handle 136 of ample size to be grasped by the palms of both hands is secured to the upper side of this plate by means of two bracket members 137. Magnets 38b of the same type as previously described, but preferably of somewhat greater length, are secured to the bottom of plate 36b in closely spaced relation. These magnets are also preferably provided with floating mountings comprising bracket members 138, one at each end of each pair of magnets 38b. These brackets have central portions 139 which are forced into engagement with the lower surface of plate 36b by means of nuts 140. The fingers 141 on each side of central portions 139, however, engage the magnets in such a way as to mount them loosely in position as is indicated by the spaces 142 between the backs of the magnets and the bottom of plate 36b.

The stripper comprises a series of parallel rods 143 which extend lengthwise between each pair of magnets 38b and are supported adjacent their ends by upright rods 144 onto which nuts 145 are threaded. Helical springs 146 normally maintain stripper rods 143 in the position shown in Figs. 17 and 19 where they do not interfere with the lifting of containers by the magnets. Rods 144, however, are arranged to slide vertically in sleeves 147 which extend upwardly from the upper side of plate 36b, and rods 144 can be depressed in order to force strippers 143 downwardly into stripping position.

In order to actuate all of the stripper rods 143 simultaneously, a second handle member 148 is provided above lifting handle 136 and preferably of U-shape in cross section so as to partially surround handle 136 when the two are squeezed together between the thumbs and palms of the hands. At each end of stripper actuating handle 148 there are bracket members 149 which at their forward portions are secured beneath nuts 145 of two pairs of the stripper supporting rods 144, one pair at each end of the lifting head. Rods 144 of the intermediate stripper bars are connected to the handle brackets 149 by means of a pair of actuating bars 150, one extending along each side of a lifting head.

It will be understood that the lifting heads 19, 19a, 19b and 19c are capable of use in loading the processing crates with containers prior to the processing operation as well as in connection with unloading the crates after such operation has been completed, and in fact are capable of use generally in the handling of containers. It will also be understood that the crane arms 23, 23a and 23b and their associated mechanisms are capable of use in manipulating the several lifting heads for the purpose of loading crates as well as for unloading them.

By the present invention there has been provided apparatus which is well adapted to the handling of containers such as tin cans or glass jars having tin caps both in the loading and particularly in the unloading of such containers from their crates in which they are placed in order to process the contents of the containers. Although several modifications of the apparatus have been described, it will be understood that other changes may be made without departing from the spirit of the invention and that it is intended to set forth the scope of the invention in the appended claims.

I claim:

1. A device for lifting containers comprising a support, a plurality of permanent magnets having both magnetic pole faces in the same plane to enable both of said poles simultaneously to engage the tops of the containers, means for securing said magnets to said support in a manner to allow limited freedom of movement thereof with respect to the support, a stripping member movably mounted on said support adjacent each of said magnets, and means mounted on the support for simultaneously moving said stripping members relative to the magnets to a position to disengage the containers from the magnets.

2. A device for lifting containers comprising a circular plate-like support, a plurality of permanent magnets arranged thereon in substantially radial position, said magnets having both magnetic pole faces in the same plane to enable both of said poles simultaneously to engage the tops of a group of containers, means for securing said magnets to said support in a manner to allow limited freedom of movement with respect to the support, a stripping member movably mounted on said support adjacent each of said magnets, and means mounted on the support for simultaneously moving said members relative to the support to a position to disengage the containers from the magnets.

3. A device for lifting containers comprising a support, a plurality of permanent magnets each comprising a channel shaped member having a web portion and two equal leg portions terminating in pole faces, means for securing said magnets to said support comprising for each magnet a member at each end thereof fixed to said support having a portion extending laterally to engage the web portion of said magnet to mount the same with a limited freedom of movement enabling the pole faces of the magnets to accommodate themselves to the tops of the containers, and means associated with said support for stripping the containers from the magnets.

4. A device for lifting containers comprising a support, a plurality of permanent magnets each comprising a channel shaped member having a web portion and two equal length legs, means for securing said magnets to said support comprising for each magnet a U-shaped bolt having its body portion between the legs of the magnet and engaging the web portion thereof, the legs of said U-bolt being secured to said support and being longer than the thickness of the web of the magnet so as to loosely secure the magnet to said support, and stripping means associated with said support for stripping the containers from said magnets.

5. A device for lifting containers comprising a support, a plurality of permanent magnets having magnetic pole faces in the same plane to allow both of said poles simultaneously to engage the tops of the containers, means for securing said magnets to said support in spaced relation to one another, a stripper mounted on the support comprising a grid-like member having parts movably disposed within the spaces between said magnets, and mechanism for moving said stripper to cause the outer surface thereof to move to a position beyond the surfaces of said pole faces to disengage the containers from the magnets.

6. A device for lifting containers comprising a support, a plurality of permanent magnets having magnetic pole faces in the same plane to enable both of said poles simultaneously to engage the tops of the containers, means for securing said magnets to said support in spaced relation to one another, a stripper mounted on the support and movable in the spaces between said magnets, and means for moving said stripper to move the outer surface thereof to a position beyond the pole faces of said magnets to disengage the containers from the magnets, said means for moving said stripper comprising a plurality of levers pivoted on the opposite face of said support from said magnets and operatively connected with said stripper, a common operating member moving said levers on their pivots, and an actuating member operatively engaging said common operating member.

7. An apparatus for lifting a group of containers from a mass of containers arranged in upright position comprising a support having a plurality of permanent magnets secured thereto to cause containers to be picked up by said device by magnetic attraction, a marginally disposed stripping device on said support having its working edge normally postioned beyond the pole faces of said magnets, yieldable resilient means for mounting said marginal stripping device on said support to allow said device to move upwardly with respect to said support by engagement with cans of said mass outside of the pick-up range of said magnets when the magnets are brought into contact with the top of said mass of cans to pick up a group of cans therefrom.

8. A device for lifting containers comprising a support, a plurality of permanent magnets having both magnetic pole faces in the same plane to enable both of said poles simultaneously to engage the tops of the containers, means for securing said magnets to said support with the pole faces thereof directed downwardly, a lifting handle attached to said support, a stripping member movably mounted adjacent each of said magnets for releasing containers therefrom, a common operating member connected to said stripping members, and means adjacent said handle operatively connected with said common operating member for the manual actuation thereof to release containers from the device.

9. A device for lifting containers comprising a support, a plurality of permanent magnets having both magnetic pole faces in the same plane to allow both of said poles simultaneously to engage the tops of the containers, means for securing said magnets to said support in a manner to allow limited freedom of movement thereof with respect to the support, a stripping device movably mounted on said support adjacent each of said magnets, and means mounted on the support for effecting relative movement between said stripping devices and said magnets to move said stripping devices to a position to disengage the containers from the magnets.

10. A device for lifting containers comprising a support, a plurality of permanent magnets having both magnetic pole faces in the same plane to allow both of said poles simultaneously to engage the tops of the containers, means providing a floating attachment for said magnets to said support, said floating attachment being constructed and arranged to allow the pole faces of adjacent magnets, at times, to assume a non-coplanar relation, a stripping device movably mounted on said support adjacent each of said magnets, and means for effecting relative movement between said stripping devices and said magnets to move said stripping devices to a position to disengage the containers from the magnets.

11. A device for lifting containers comprising a support, a plurality of permanent magnets having both magnetic pole faces in the same plane to allow both of said poles simultaneously to engage the tops of the containers, means providing a floating attachment for said magnets to said support to allow limited freedom of movement between each magnet and said support, a stripping device movably mounted on said support adjacent each of said magnets, and means mounted on the support for effecting relative movement between said stripping devices and said magnets to cause the pole faces of the magnets to project beyond said stripping devices to allow the lifting head to pick up a group of containers and for causing said stripping devices to project beyond the magnet pole faces to disengage the containers therefrom.

12. A device for lifting containers comprising a support having a plurality of elongated channel-shaped permanent magnets projecting from the lower face thereof, each of said magnets having co-planar pole faces, means providing a floating attachment between said magnets and said support, said floating attachment being constructed and arranged to allow the pole faces of adjacent magnets, at times, to assume a non-coplanar relation, and means associated with said support for disengaging the containers from said magnets.

13. A device for lifting containers comprising a support, a plurality of permanent magnets each comprising a channel-shaped member having a web portion and two equal leg portions terminating in pole faces, attaching mechanism for securing said magnets to said support comprising for each magnet means fixed to said support and engaging the web portion thereof and yielding means between the back of said channel-shaped magnet and said support to mount the magnets with a limited freedom of movement to allow the pole faces of the magnets to accommodate themselves, when necessary, to the tops of the containers, and means mounted on the support for stripping the containers from the magnets.

14. A device for lifting containers comprising a support, a plurality of permanent magnets each comprising a channel-shaped member having a web portion and two equal leg portions terminating in pole faces, attaching mechanism for securing said magnets to said support comprising for each magnet means fixed to said support and engaging the web portion thereof and a flat spring between the back of said channel-shaped magnet and said support to mount the magnets with a limited freedom of movement to allow the pole faces of the magnets to accommodate themselves, when necessary, to the tops of the containers, and means mounted on the support for stripping the containers from the magnets.

PAUL E. FISCHER.

REFERENCES CITED

The following references are of record in the file of this patent:

UNITED STATES PATENTS

| Number | Name | Date |
|---|---|---|
| 512,381 | Keyes | Jan. 9, 1894 |
| 2,503,467 | Blind | Apr. 11, 1950 |

FOREIGN PATENTS

| Number | Country | Date |
|---|---|---|
| 429,199 | Great Britain | May 27, 1935 |